(12) United States Patent
Singh

(10) Patent No.: US 11,797,686 B1
(45) Date of Patent: Oct. 24, 2023

(54) ASSESSING RISK FROM USE OF VARIANTS OF CREDENTIALS

(71) Applicant: Citrix Systems, Inc., Fort Lauderdale, FL (US)

(72) Inventor: Manbinder Pal Singh, Coral Springs, FL (US)

( * ) Notice: Subject to any disclaimer, the term of this patent is extended or adjusted under 35 U.S.C. 154(b) by 295 days.

(21) Appl. No.: 17/206,396

(22) Filed: Mar. 19, 2021

(51) Int. Cl.
*G06F 21/57* (2013.01)
*G06F 21/31* (2013.01)

(52) U.S. Cl.
CPC .......... *G06F 21/577* (2013.01); *G06F 21/31* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 9,077,747 B1 * | 7/2015 | Chen | ............... | H04L 63/1433 |
| 9,838,384 B1 * | 12/2017 | Kane-Parry | ............ | G06F 21/316 |
| 9,967,236 B1 * | 5/2018 | Ashley | ............... | H04L 63/20 |
| 10,129,298 B2 * | 11/2018 | Grady | ............... | H04L 63/083 |
| 10,645,075 B1 * | 5/2020 | Rafferty | ............. | H04W 12/068 |
| 10,909,235 B1 * | 2/2021 | Farivar | .................. | G06F 21/46 |
| 11,036,848 B2 * | 6/2021 | Kras | ..................... | G06F 21/46 |
| 11,140,152 B2 * | 10/2021 | Verma | ................. | G06F 21/577 |
| 11,223,636 B1 * | 1/2022 | Angara | ................ | H04L 9/3247 |
| 11,283,832 B2 * | 3/2022 | Endler | ................ | H04L 63/1425 |
| 11,399,021 B2 * | 7/2022 | Endler | ................... | G06F 21/46 |
| 2013/0014236 A1 * | 1/2013 | Bingell | .............. | H04L 63/0846 726/6 |
| 2013/0269010 A1 * | 10/2013 | Wheeler | ................. | G06F 21/46 726/6 |
| 2014/0373088 A1 * | 12/2014 | Aggarwal | ............. | G06F 21/604 726/1 |
| 2019/0251250 A1 * | 8/2019 | Nandakumar | ......... | G06F 21/46 |
| 2020/0042694 A1 * | 2/2020 | Karpovsky | ............ | G06N 20/00 |
| 2020/0137096 A1 * | 4/2020 | Endler | ................. | H04L 63/083 |
| 2020/0213334 A1 * | 7/2020 | Kutner | .................. | H04L 63/101 |
| 2021/0006573 A1 * | 1/2021 | Britt | ...................... | G06F 16/258 |
| 2022/0027498 A1 * | 1/2022 | Vandanapu | .......... | H04L 9/0643 |
| 2022/0050894 A1 * | 2/2022 | Miracolo | ................ | G06F 21/46 |
| 2022/0103545 A1 * | 3/2022 | Hebert | .................. | H04L 63/083 |
| 2022/0180368 A1 * | 6/2022 | Immaneni | .......... | G06Q 20/4014 |
| 2022/0191233 A1 * | 6/2022 | Kras | ................... | G06F 21/6245 |

* cited by examiner

*Primary Examiner* — James R Turchen

(57) ABSTRACT

In one aspect, an example methodology implementing the disclosed techniques includes, by a computing device, responsive to a user requesting authorization to access an application, segmenting a string of content into a plurality of substrings of different lengths, the string of content being an input to access the application. The method also includes, responsive to a determination that data in a first data structure represents a first substring of the plurality, identifying a length of another substring and at least one type of character present within that substring based on the data in the first data structure, determining a risk of unauthorized use of the string of content based on the identified length and the at least one type of character present within that substring, and allowing access to the application using the string of content based on the determined risk.

18 Claims, 11 Drawing Sheets

Password: "Secret@187eG"

Substring Length: i=4

Substring Characters: "Secr"

╱— 702a

| 9 | 8 | 7 | 6 | 5 | 4 | 3 | 2 | 1 | 0 |
|---|---|---|---|---|---|---|---|---|---|
| 0 | 1 | 0 | 1 | 0 | 0 | 1 | 0 | 0 | 0 |
| | L = 8<br>C = ULDS | | L = 8<br>C = ULDS | | | L = 8<br>C = ULDS | | | |

| # of Characters | | Types of Characters Remaining (D=numeric; L=lower case; U=upper case; S=special) | | | | |
|---|---|---|---|---|---|---|
| | | D | L | UL | ULD | ULDS |
| | | 10 | 26 | 52 | 62 | 95 |
| Remaining Password Length | 4 | 0.3 ms | 15 ms | 24 ms | 490 ms | 2.7 s |
| | 5 | 3 ms | 400 ms | 13 s | 31 s | 4.3 mins |
| | 6 | 33 ms | 10 s | 11 mins | 32 mins | 6.8 hrs |
| | 7 | 330 ms | 4.5 mins | 9.5 hrs | 33 hrs | 27 days |
| | 8 | 3.3 s | 1.9 hrs | 21 days | 84 days | 7 yrs |
| | 9 | 33 s | 2.1 days | 2.9 yrs | 14 yrs | 670 yrs |
| | 10 | 5.6 mins | 54 days | 150 yrs | 890 yrs | $6.3 \times 10^4$ yrs |
| | 11 | 56 mins | 3.9 yrs | $7.9 \times 10^3$ yrs | $5.5 \times 10^4$ yrs | $6 \times 10^6$ yrs |
| | 12 | 9.3 hrs | 100 yrs | $4.1 \times 10^5$ yrs | $3.4 \times 10^6$ yrs | $5.7 \times 10^8$ yrs |
| | 13 | 3.9 days | $2.6 \times 10^3$ yrs | $2.1 \times 10^7$ yrs | $2.1 \times 10^8$ yrs | $5.4 \times 10^{10}$ yrs |
| | 14 | 39 days | $6.8 \times 10^4$ yrs | $1.1 \times 10^9$ yrs | $1.3 \times 10^{10}$ yrs | $5.1 \times 10^{12}$ yrs |
| | 15 | 1.1 yrs | $1.8 \times 10^5$ yrs | $5.8 \times 10^{10}$ yrs | $8.1 \times 10^{11}$ yrs | $4.9 \times 10^{14}$ yrs |
| | 16 | 11 yrs | $4.6 \times 10^7$ yrs | $3 \times 10^{12}$ yrs | $5 \times 10^{13}$ yrs | $4.7 \times 10^{16}$ yrs |

FIG. 6

Password: "Secret@187eG"
Substring Length: i=4
Substring Characters: "Secr"

| 9 | 8 | 7 | 6 | 5 | 4 | 3 | 2 | 1 | 0 |
|---|---|---|---|---|---|---|---|---|---|
| 0 | 1 | 0 | 1 | 0 | 0 | 1 | 0 | 0 | 0 |
|   | L = 8<br>C = ULDS |   | L = 8<br>C = ULDS |   |   | L = 8<br>C = ULDS |   |   |   |

Password: "Secret@187eG"
Substring Length: i=5
Substring Characters: "Secre"

| 9 | 8 | 7 | 6 | 5 | 4 | 3 | 2 | 1 | 0 |
|---|---|---|---|---|---|---|---|---|---|
| 0 | 1 | 0 | 1 | 1 | 0 | 0 | 0 | 0 | 0 |
|   | L = 7<br>C = ULDS |   | L = 7<br>C = ULDS | L = 7<br>C = ULDS |   |   |   |   |   |

Password: "Secret@187eG"
Substring Length: i=6
Substring Characters: "Secret"

702c

| 9 | 8 | 7 | 6 | 5 | 4 | 3 | 2 | 1 | 0 |
|---|---|---|---|---|---|---|---|---|---|
| 1 | 1 | 0 | 0 | 0 | 0 | 1 | 0 | 0 | 0 |
| L=6<br>C=ULDS | L=6<br>C=ULDS | | | | | L=6<br>C=ULDS | | | |

FIG. 7C

Password: "Secret@187eG"
Substring Length: i=7
Substring Characters: "Secret@"

702d

| 9 | 8 | 7 | 6 | 5 | 4 | 3 | 2 | 1 | 0 |
|---|---|---|---|---|---|---|---|---|---|
| 0 | 1 | 0 | 0 | 0 | 1 | 0 | 0 | 0 | 1 |
| | L=5<br>C=ULD | | | | L=5<br>C=ULD | | | | L=5<br>C=ULD |

FIG. 7D

ASSESSING RISK FROM USE OF VARIANTS OF CREDENTIALS

BACKGROUND

Many computing resources require user credentials, such as a username and a password, to be provided and authenticated before granting access to the computing resources. For example, a user who wants to gain access to a software-as-a-service (SaaS) application may be requested to enter a username and password. If the user enters the correct username and password, then access to the SaaS application may be granted. Otherwise, access may be denied.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

Computing resources may require user credentials, such as a username and a password, to be provided and authenticated. However, users often reuse passwords or use variants of passwords across multiple different accounts. For example, an employee of an organization may reuse passwords or use simple variants of the passwords for user authentication with their corporate accounts (e.g., user accounts to access applications associated with the organization, sometimes referred to as "corporate applications") across one or more different personal accounts (e.g., user accounts to access applications not classified as corporate applications).

Reusing passwords or using variants of corporate passwords for user authentication with personal accounts may create security vulnerabilities for organizations. For example, assume an employee Alice of an organization ALPHA Corporation uses the password Secretcorp%Alice to access to the corporate application workday.com. Alice may use a variant of the corporate password, e.g., Secret%Alice1, as to access to the personal application homeshop.com. This can create a security risk for ALPHA Corporation since Alice's personal password, which is a variant of Alice's corporate password, can be compromised by the personal application that is not under the control or management of the organization. In more detail, with knowledge of Alice's personal password, an attacker can use portions (e.g., substrings of characters from the beginning and/or end of the string) of the compromised personal password to perform a brute force attack to guess or ascertain Alice's corporate password. For example, an attacker can use a substring (e.g., Secret) of the compromised personal password, Secret%Alice1, as the initial characters to brute force guess the remaining portion (e.g., corp%Alice) of the corporate password, Secretcorp%Alice.

The difficulty (e.g., the amount of time and/or cost required) to brute force guess a remaining portion of a password is based on attributes of the remaining portion of the password, such as the number of characters and the class of characters, that needs to be guessed. For example, in the example above, it may be relatively difficult to brute force guess a remaining substring of Alice's corporate password (i.e., corp%Alice) since it includes nine characters that need to be brute force guessed. On the other hand, assume that Alice uses a corporate password, Secret%AliceWork. In this case, Alice's personal password and corporate password vary only in the last four characters ("1" vs "Work"), which may be relatively easy to guess using brute force.

Also, the number of characters that are the same between a corporate password and a variant of the corporate password may not provide a good indication of the security risk created by using variants of corporate passwords. For example, assume a corporate password, SecretABC123!@#$%corporation, and a personal password, SecretAB456, which is a variant of the corporate password. In this case, although the similarity between the corporate password and the variant of the corporate password, SecretAB, is large, e.g., eight characters, the security risk is relatively small since it may be very difficult to brute force guess the non-matching dissimilar portion of the corporate password, BC123!@#$%corporation, to ascertain the corporate password, SecretABC123!@#$%corporation. In comparison, assume a corporate password, Sec123, and a personal password, Sec456, which is a variant of the corporate password. Here, although the similarity between the corporate password and the variant of the corporate password, Sec, is small, e.g., three characters, the security risk is much larger since it may be not difficult to brute force guess the non-matching dissimilar portion of the corporate password, 123, to ascertain the corporate password, Sec123.

Thus, it is appreciated herein that, in the case of compromise of a variant of a corporate password, the remaining non-matching portion (i.e., dissimilar portion) of the corporate password that needs to be brute force guessed to ascertain the corporate password provides a good indication of the security risk created by the use of variants of corporate passwords. Embodiments of the present disclosure provide solutions to these and other technical problems described herein.

In accordance with one illustrative embodiment provided to illustrate the broader concepts, systems, and techniques described herein, a method may include, by a computing device, responsive to a user requesting authorization to access an application, segmenting a string of content into a plurality of substrings of different lengths, the string of content being an input to access the application. The method may also include, responsive to a determination that data in a first data structure represents a first substring of the plurality, identifying a length of another substring and at least one type of character present within that substring based on the data in the first data structure, determining a risk of unauthorized use of the string of content based on the identified length and the at least one type of character present within that substring, and allowing access to the application using the string of content based on the determined risk.

According to another illustrative embodiment provided to illustrate the broader concepts described herein, a system includes a memory and one or more processors in communication with the memory. The processor may be configured to, responsive to a user requesting authorization to access an application, segment a string of content into a plurality of substrings of different lengths, the string of content being an input to access the application. The processor may be also configured to, responsive to a determination that data in a first data structure represents a first substring of the plurality, identify a length of another substring and at least one type of character present within that substring based on the data in the first data structure, determine a risk of unauthorized use of the string of content based on the identified length and the at least one type of character present within that substring, and allow access to the application using the string of content based on the determined risk.

According to another illustrative embodiment provided to illustrate the broader concepts described herein, a method may include, by a computing device, responsive to a user requesting authorization to access a personal application, segmenting a password input to request access to the personal application into a plurality of substrings of different lengths. The method may also include, responsive to a determination that there is a match for a first substring of the plurality of substrings in a data structure that represents substrings of corporate passwords of the user, determining, from the data structure, classifications of one or more substrings of the corporate passwords of the user and lengths of the one or more substrings of the corporate passwords, determining a risk associated with a use of the password input to access the personal application based on the classifications of one or more substrings of the corporate passwords of the user and lengths of the one or more substrings of the corporate passwords, and allowing access to the personal application using the password based on the determined risk.

According to another illustrative embodiment provided to illustrate the broader concepts described herein, a system includes a memory and one or more processors in communication with the memory. The processor may be configured to, responsive to a user requesting authorization to access a personal application, segment a password input to request access to the personal application into a plurality of substrings of different lengths. The processor may be also configured to, responsive to a determination that there is a match for a first substring of the plurality of substrings in a data structure that represents substrings of corporate passwords of the user, determine, from the data structure, classifications of one or more substrings of the corporate passwords of the user and lengths of the one or more substrings of the corporate passwords, determine a risk associated with a use of the password input to access the personal application based on the classifications of one or more substrings of the corporate passwords of the user and lengths of the one or more substrings of the corporate passwords, and allow access to the personal application using the password based on the determined risk.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 6 shows a table showing estimates of times to brute force guess character strings of varying lengths.

FIGS. 7A-7D collectively illustrate operation of data structures to record substrings of corporate credentials, in accordance with an embodiment of the present disclosure.

DETAILED DESCRIPTION

Figure 1:
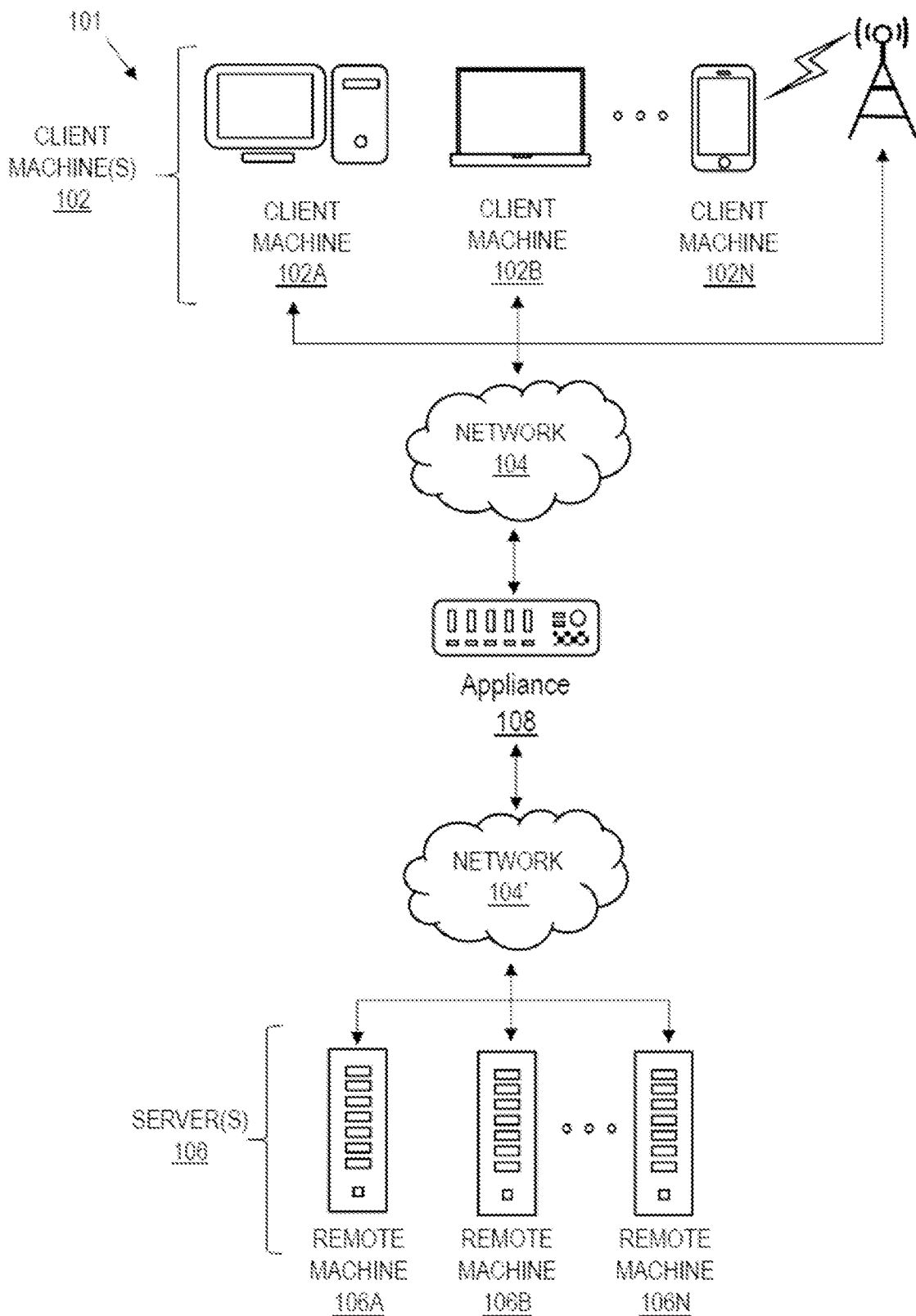
FIG. 1 is a diagram of an illustrative network computing environment in which embodiments of the present disclosure may be implemented.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
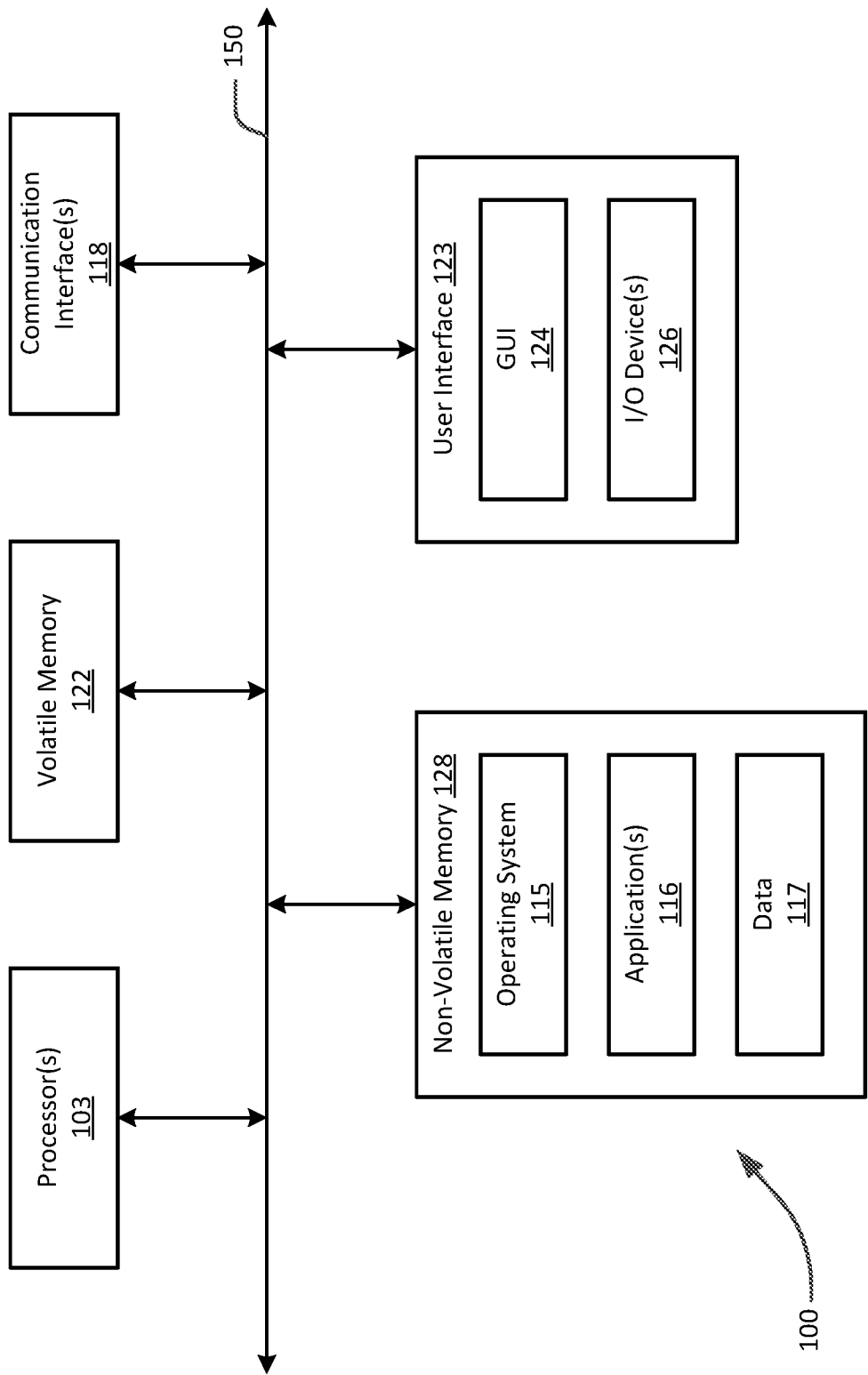
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
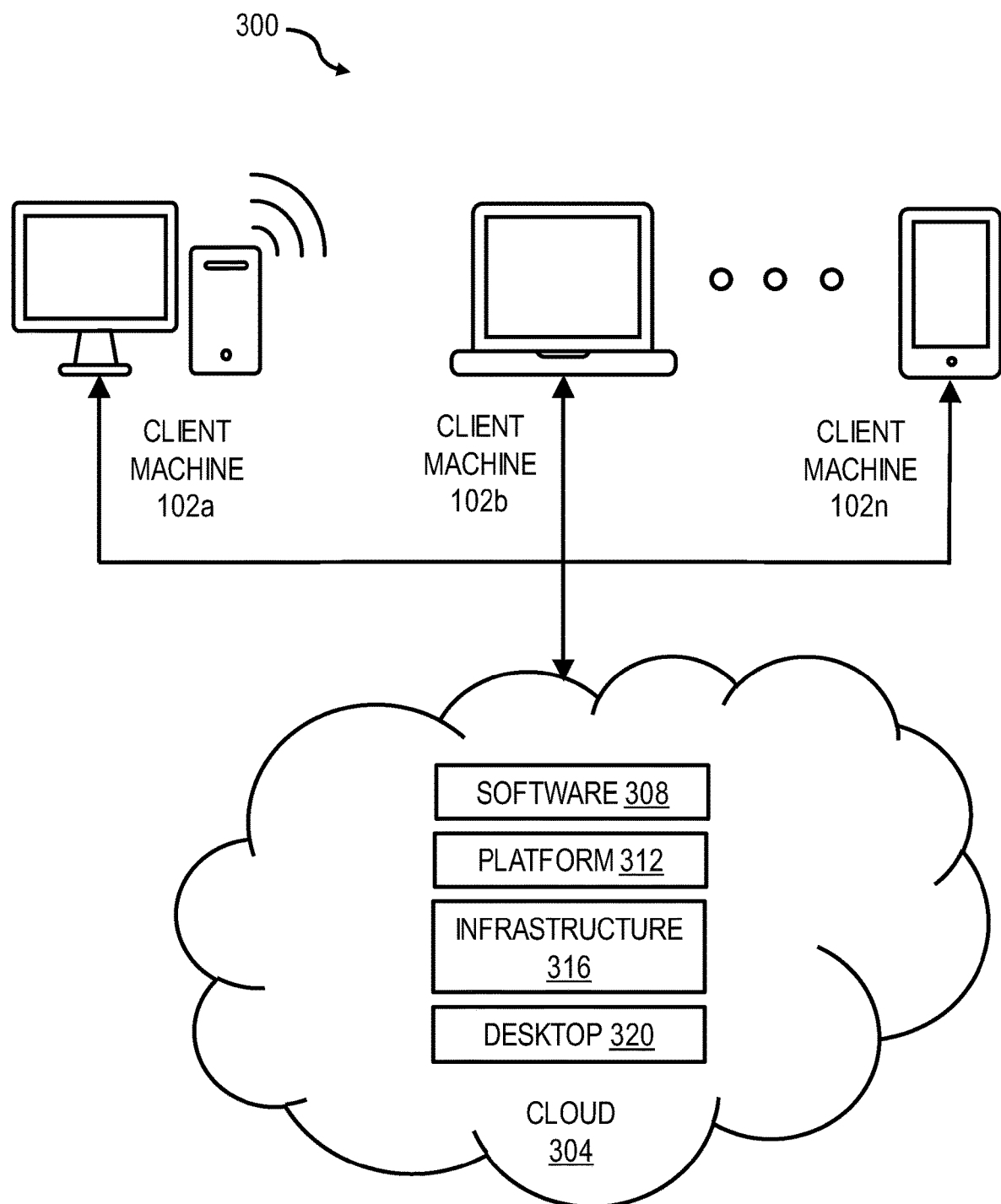
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g., Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
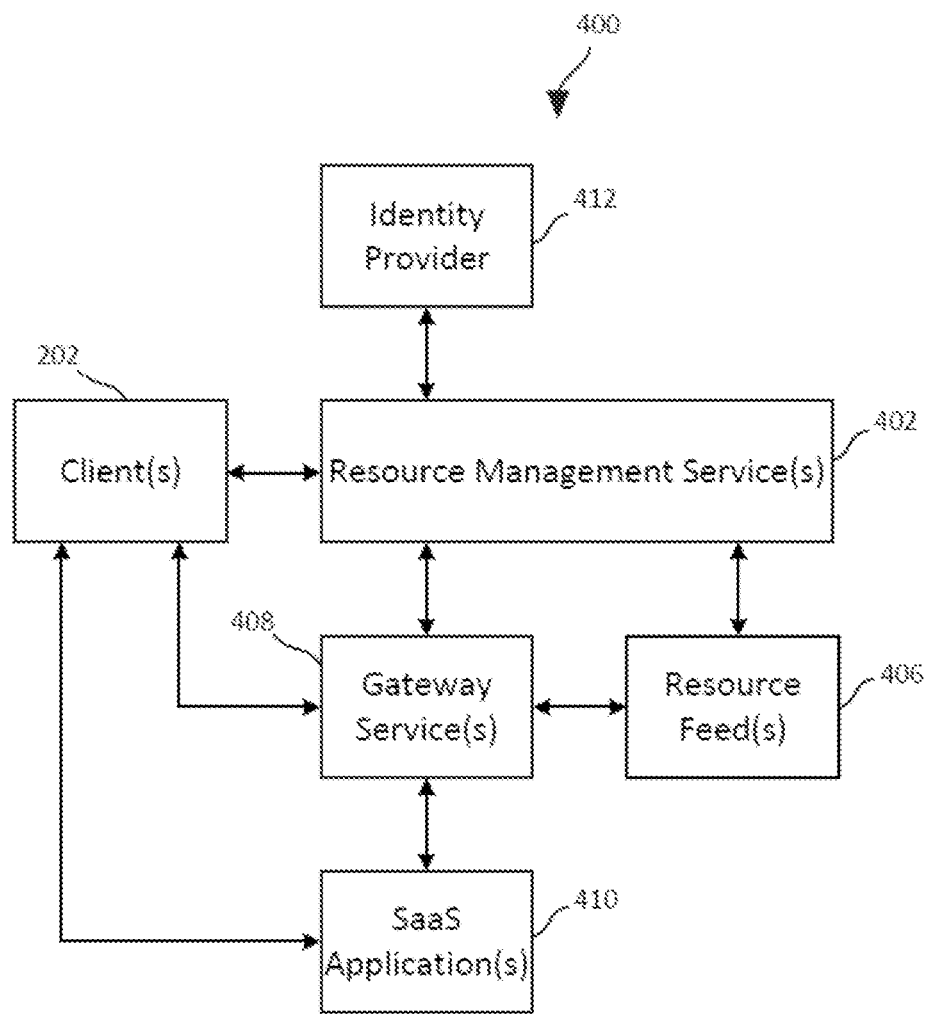
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
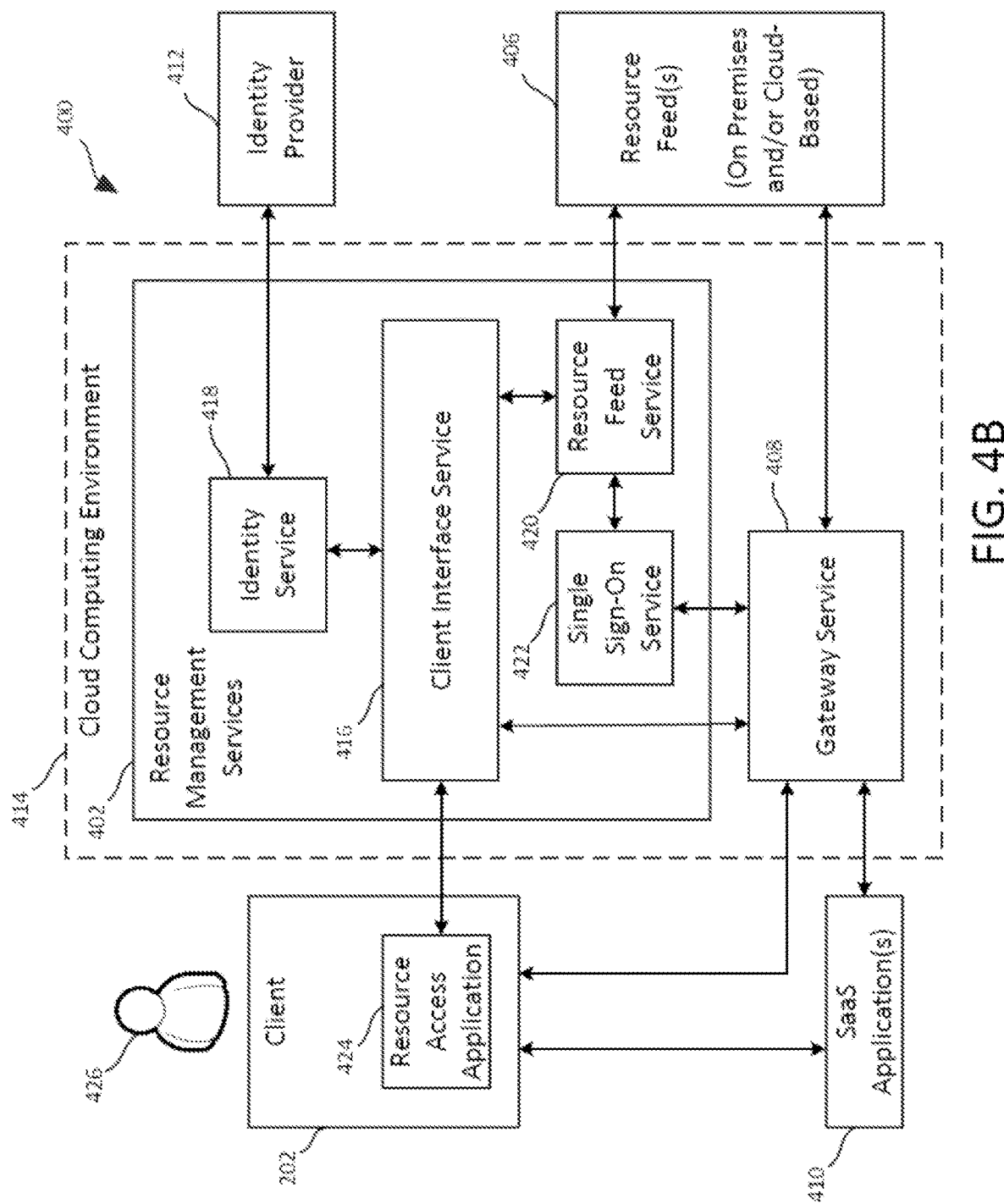
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®), one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource access application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
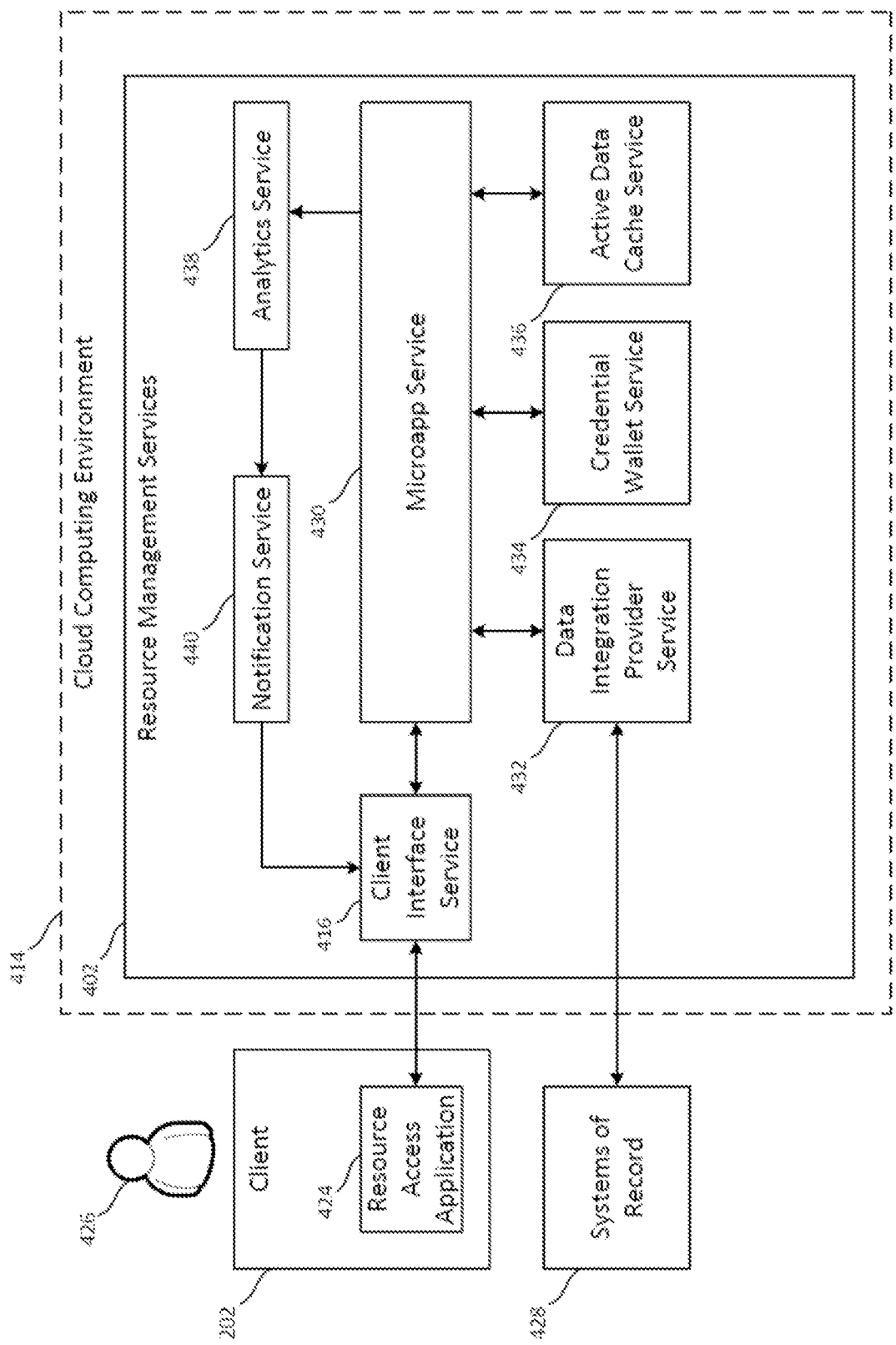
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figure 5:
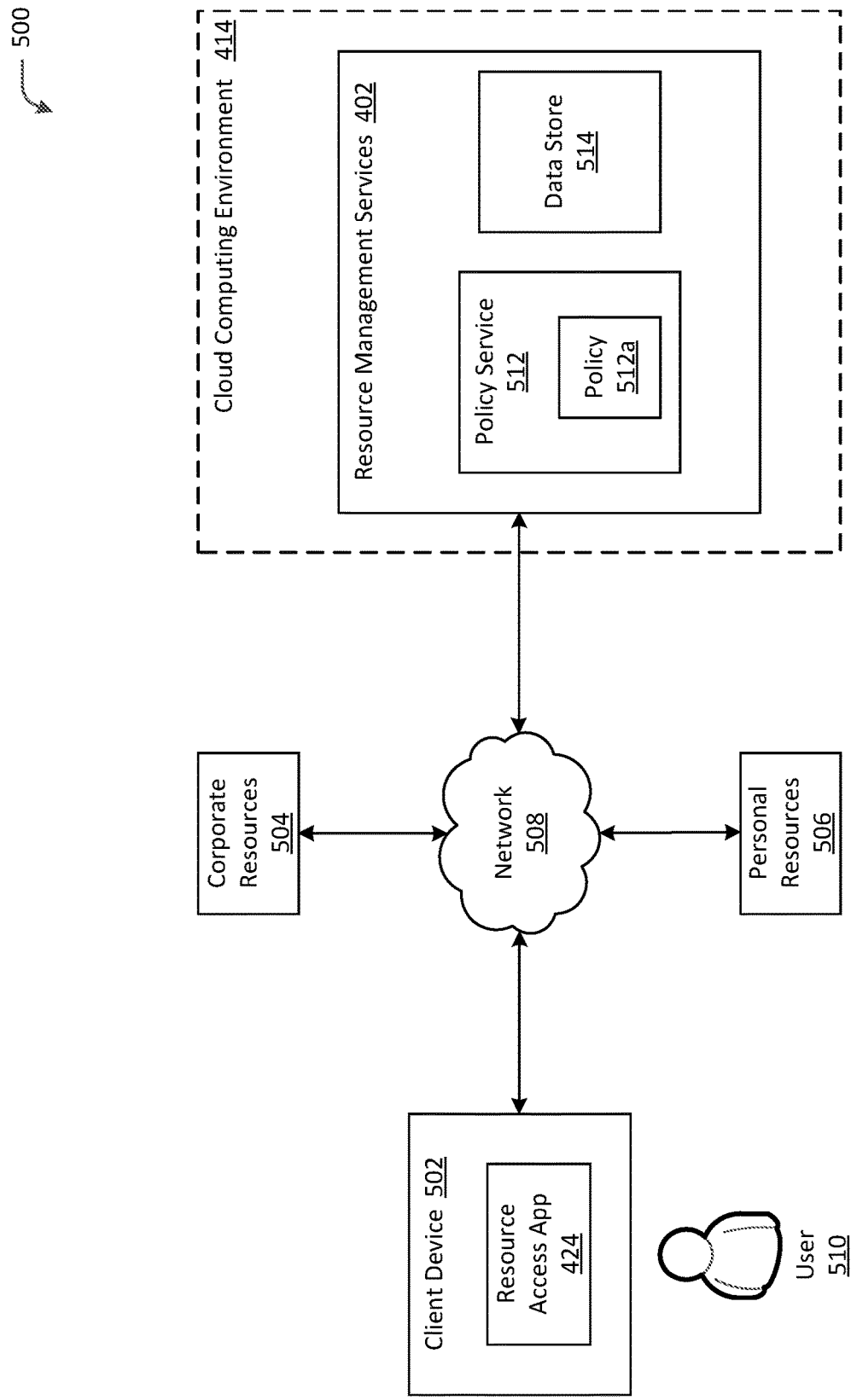
FIG. 5 is a block diagram of an illustrative network environment in which client devices can assess security risk from use of variants of credentials, in accordance with an embodiment of the present disclosure.

FIG. 5 is a block diagram of an illustrative network environment 500 in which client devices can assess security risk from use of variants of credentials, in accordance with an embodiment of the present disclosure. More specifically, in some embodiments, a client device can assess security risk associated with use of variants of corporate passwords (i.e., passwords used access resources and applications provided by an organization, sometimes referred to herein as "corporate resources") for user authentication to one or more personal resources (i.e., resources that are distinct from the corporate resources). In FIG. 5, like elements of system 400 of FIGS. 4A-4C are shown using like reference designators. As such, the previous relevant discussion with respect to features of the like elements shown using like reference designators is equally applicable here, including the previous relevant discussion with respect to client 202, resource access application 424, resource management services 402, and cloud computing environment 414.

As shown in FIG. 5, network environment 500 can include one or more client devices 502, resource management services 402, one or more corporate resources 504, and one or more personal resources 506 communicably coupled to one another via a network 508. Network 508 may correspond to one or more to wireless or wired computer networks including, but not limited to, local-area networks (LANs), metropolitan area networks (MANs), wide area networks (WANs), wireless local-area networks (WLAN), primary public networks, primary private networks, cellular networks, Wi-Fi (i.e., 802.11) networks, Bluetooth networks, and Near Field Communication (NFC) networks. In some embodiments, network 506 may include another network or a portion or portions of other networks.

Network environment 500 may provide services for one or more organizations, with the organizations having one or more users associated with it. A given client device 502 may be assigned to or otherwise associated with a particular user. For example, as shown in FIG. 5, client device 502 may be assigned to, or otherwise associated with, a user 510. While only one client device 502 and one corresponding user 510 are shown in FIG. 5, the structures and techniques sought to be protected herein can be applied to any number of organizations, users, and devices.

Client device 502 can include smartphones, tablet computers, laptop computers, desktop computers, or other computing devices configured to run user applications (or "apps"). In some embodiments, client device 502 may be substantially similar to client machine 102 described above in the context of FIGS. 1 and 3, computing device 100 described above in the context of FIG. 2, and/or client 202 described above in the context of FIGS. 4A-4C. It should be appreciated that the structures and techniques sought to be protected herein are not limited to application with any particular type of client devices and, for example, can be used in conjunction with both mobile and desktop clients.

With continued reference to, and as shown in FIG. 5, user 510 may access resource management services 402 and other services and network resources (e.g., personal resources 506) using resource access application 424 installed on client device 502. Resource management services 402 may manage and streamline access to corporate resources provided by an organization for access and use by users associated with the organization. Resource access application 424 and associated components may provide user 510 with a personalized, all-in-one interface enabling seamless access to the user's resources, such as SaaS and web applications, files, virtual Windows applications, virtual Linux applications, desktops, mobile applications, Citrix Virtual Apps and Desktops™, local applications, and other data. In one example, resource access application 424 may be the CITRIX WORKSPACE app. In an implementation, resource access application 424 may include a web browser for accessing web-based SaaS applications (e.g., personal resources 506) along with other types of web apps and websites.

Corporate resources 504 can include applications and resources that are provided by the organization. Corporate resources 504 are generally under the control of the organization and, as such, may be trusted by the organization. In some embodiments, corporate resources 504 can include the applications and resources managed and provided via resource management services 402. Additionally or alternatively, the organization may specify one or more applications and/or resources that are to be corporate resources 504.

Personal resources 506 can include resources that are distinct from the corporate resources 504 that are managed and provided by the organization. Personal resources 506 are generally not under the control of the organization. In some cases, personal resources 506 include applications, websites, or other resources that not managed by or otherwise associated with the user's organization. In some embodiments, personal resources 506 may include any resource that is not specifically identified as a corporate resource 504 and, as such, may include illegitimate resources such as phishing websites (i.e., illegitimate websites disguised to appear similar or identical to legitimate websites).

Resource management services 402 may include a policy service 512 and a data store 514. Policy service 512 can maintain policy and other configuration information related to the one or more organizations operating in network environment 500 including security policies defined by the organizations for enforcement within network environment 500. Via policy service 512, an organization can define security policies related to users 510 and devices 502 associated with the organization. As shown in FIG. 5, policy service 512 may include a security policy 512a that defines the organization's credentials (e.g., password) protection policy. For example, an organization may define, via security policy 512a, a policy that restricts or otherwise discourages the use of variants of corporate passwords whose risk assessment scores do not satisfy (e.g., do not exceed) a threshold (e.g., a predetermined risk threshold), such as, 12 months, 18 months, 24 months, or any other suitable duration, for user authentication to personal applications (e.g., one or more personal resources 506). As another example, an organization may define, security policy 512a, a policy that restricts or otherwise discourages the use of variants of corporate passwords whose risk assessment scores do not satisfy a threshold for user authentication to personal applications (e.g., one or more personal resources 506) and/or another corporate application (e.g., another corporate resource 504).

In some implementations, the same or another security policy 512a can include information for determining corporate resources 504. For example, an organization can specify in security policy 512a an intranet uniform resource locator (URL) and/or a domain (e.g., Intranet=*.acme.net). In this case, all the applications and resources in the specified URL/domain may be considered a corporate resource 504. As another example, an organization may specify in security policy 512a a list of one or more applications and resources (e.g., www.acme.corpapp.com, www.appservice.com/acme, and other domains) that are to be considered corporate resources 504. As another example, an organization may specify in security policy 512a one or more specific applications (e.g., hotmail.com, icecream.com, etc.) that are non-corporate (i.e., not a corporate resource 504). In any case, in some implementations, a domain that is not identified as a corporate application and/or resource in security policy 512a may be considered a personal application (i.e., personal resource 506).

As discussed in detail below, these and other types of security policies may be used to restrict use of variants of corporate credentials (e.g., passwords). In some embodiments, policy service 512 may identify which of the policies are applicable for which users/devices and deliver applicable security policies (e.g., one or more security policies 512a) to client devices 502 within network environment 500.

Data store 514 can maintain a record of substrings of the corporate credentials (e.g., passwords). As used herein, the term "substring" (or "substrings" in the plural) refers, in addition to its ordinary meaning, to a contiguous sequence of one or more characters starting from the beginning or starting from the end of a string of characters. Maintaining substrings of corporate credentials in this manner provides for identifying variants of the corporate credentials. For example, a personal password that has a substring that matches (i.e., is equivalent to) a recorded substring of a corporate password can be identified as a variant of the corporate password. In some implementations, data store 514 may include a plurality of data structures (e.g., plurality of Bloom filters) for maintaining the recorded substrings of corporate credentials. In such implementations, individual data structures of the plurality of data structures can represent substrings of a specific length (e.g., substrings of x characters from the beginning or end of a character string) of the different corporate credentials belonging to a user. For example, a first data structure can represent substrings of a first length (e.g., 3 characters) from the beginning of the different corporate credentials belonging to a user, a second data structure can represent substrings of a second length (e.g., 4 characters) from the beginning of the different corporate credentials of the user, a third data structure can represent substrings of a third length (e.g., 5 characters) from the beginning of the different corporate credentials of a user, and so on. In addition to representing a substring of a corporate credential, the positions in the data structure representative of a recorded substring of a corporate credential includes or otherwise have associated therewith information related to the attributes of the remaining portion of the corporate credential (e.g., the remaining substring of the corporate password from which the recorded substring originates). The information related to attributes of remaining portions other than the recorded substrings of corporate credentials allow for determination of risk associated with the use of variants of the corporate credentials.

A Bloom filter is a space-efficient probabilistic data structure that can be used to determine whether an element is a member of a set. A Bloom filter can be implemented using data structure, such as a data vector, where individual positions in the data structure can be individually addressed. A Bloom filter is initialized by setting the value of each position in the data structure to an initial value of zero ("0"), which indicates that no elements have been added to the Bloom filter. There may be a number, k, of different hash functions defined for the Bloom filter. Given an element input to each of the k hash functions, each hash function maps (or hashes) the element to one of the positions in the data structure. In the case of a Bloom filter, the term "data structure" used herein can refer to both the Bloom filter itself and to the data structure on which it is implemented. The subject matter sought to be protected herein may be implemented using data structures other than Bloom filters.

To add a given substring of a corporate credential (e.g., a substring of a corporate password) to the counting Bloom filter, the substring of the corporate credential can be input to k hash functions (e.g., each of k=4 hash functions) to obtain a corresponding number, k, of positions in the data structure. The positions in the data structure obtained by hashing the substring of the corporate credential are representative of the substring of the corporate credential. The value of each of the obtained positions in the data structure can then be set to a value of one (1) to indicate addition of the substring of the corporate credential in the Bloom filter. Note that if other substrings of corporate credentials were previously added to the Bloom filter, then the values of some of the positions in the data structure obtained by hashing a given substring of a corporate credential may already be set to a value of one (1). Upon adding the substring of the corporate credential in the Bloom filter, information related to the attributes of the remaining portion of the corporate credential (i.e., the portion of the corporate credential other than the substring that is added to the Bloom filter), such as, for example, a number of characters and the class of characters (e.g., numeric, lower case, upper case, and special), may be recorded. In an implementation, such information related to the attributes of the remaining portion of the corporate credential may be recorded at the positions in the data structure representative of the added substring. Recording information related to the attributes of the remaining portion of the corporate credential in this manner allows for computing a score (e.g., a risk assessment score) related to the use of the variant of the corporate credential.

To query for a given substring of a credential (e.g., a substring of a corporate password) in the Bloom filter (e.g., to determine whether the given substring of the credential matches a substring of a corporate credential in the Bloom filter and, thus, is a variant of the corporate credential), the given substring of the credential is input to the k hash functions associated with the Bloom filter to obtain a corresponding number of positions in the data structure. If a value of any one of these positions in the data structure is zero (0), the given substring of the credential is not in the Bloom filter. If the values of all of these positions in the data structure are one (1), the given substring of the credential is likely in the Bloom filter. In other words, if there is a matching entry for the given substring in the Bloom filter, then the given substring is likely to be a substring of a corporate credential.

As a solution to the aforementioned and other technical problems related to the use of variants of passwords, in some embodiments, resource access application 424 may be programmed or otherwise configured to monitor navigation events to determine whether user 510 is using resource access application 424 to login to a corporate resource 504 or a personal resource 506. For example, the organization may configure the URLs/domains of corporate resources to which user 510 has access in a security policy (e.g., policy 512a). The URLs/domains that are not configured may be considered personal resources. Resource access application 424 can then determine from the configured corporate resource URLs/domains whether login is to a corporate resource 504 or a personal resource 506. Upon detecting login to corporate resource 504 or personal resource 506, resource access application 424 can intercept or otherwise receive the credential (e.g., password) that was input or otherwise provided to login to the corporate resource 504 or personal resource 506.

If resource access application 424 determines that user 510 is logging into a corporate resource 504 (i.e., the input credential is a corporate password or other corporate credential), then resource access application 424 can record one or more substrings of the corporate credential for use later in identifying variants of the corporate credential. In an example implementation, resource access application 424 can segment the corporate credential into one or more substrings of different lengths (e.g., different predetermined lengths). Resource access application 424 can then add the substrings to a Bloom filter that is being used for recording substrings of a specific length of the corporate credentials. For example, a substring of a first length can be added to a Bloom filter that is being used for recording substrings of the first length, a substring of a second length can be added to a different Bloom filter that is being used for recording substrings of the second length, and so on. For each substring of a corporate credential added to a Bloom filter, resource access application 424 can record information related to the attributes, such as a number of characters and the class of characters, of the remaining portion of the corporate credential from which the substring was segmented.

In some embodiments, substrings belonging to the different users can be recorded separately using different data structures (e.g., Bloom filters). For example, substrings belonging to a first user can be recorded using a first set of data structures, substrings belonging to a second user can be recorded using a second set of data structures, and so on.

With continued reference to FIG. 5, if resource access application 424 determines that user 510 is logging into a personal resource 506, resource access application 424 can use the Bloom filters used for recording the substrings of the corporate credentials of user 510 to determine whether the input credential is a variant of a corporate credential of user 510. For example, resource access application 424 can segment the input credential into one or more substrings of different lengths (e.g., predetermined lengths). In an example implementation, these predetermined lengths may be the same as the predetermined lengths of the substrings of corporate credentials. Starting with the substring of the shortest length, resource access application 424 can query the Bloom filter used for recording substrings of corporate credentials of the same length. If a match is found, resource access application 424 can determine that the input credential is a variant of a corporate credential. In this case, resource access application 424 can determine a score (e.g., a risk assessment score) related to the use of the variant of the corporate credential (i.e., the input credential). In some embodiments, the risk assessment score may be computed as an estimate of the time and/or cost needed to brute force guess a remaining portion of the corporate credential. This estimate can be based on the recorded information related to the attributes (e.g., a number of characters and the class of characters) of the remaining portion of the corporate credential. Then, based on a predetermined risk threshold, resource access application 424 can take an appropriate action with respect to the use of the variant of the corporate credential. For example, the predetermined risk threshold may define an estimated time that may be needed to brute force guess a corporate credential that is acceptable to the organization. As one example, if the risk assessment score does not satisfy the predetermined risk threshold, resource access application 424 may cause a notification to be sent to a security operations center of the organization. As another example, if the risk assessment score does not satisfy the predetermined risk threshold, resource access application 424 may cause a warning message to be sent to user 510 informing of the potential security risk.

In some embodiments, an applicable security policy may allow a predetermined number, C (e.g., C=3), of user authorizations using a credential that has a score that does not satisfy the predetermined risk threshold. In such embodiments, resource access application 424 may decrement a counter each time the credential is used for user authentication on either a corporate resource or a personal resource. Then, upon determining that the predetermined number of user authentications have been utilized, resource access application 424 may take an appropriate action to restrict the use of the credential. For example, resource access application 424 may prevent the login attempt until the credential is changed or otherwise updated to satisfy the predetermined risk threshold.

Continuing with the above example, if the risk assessment score satisfies (e.g., meets or exceeds) the predetermined risk threshold, resource access application 424 may continue processing with another substring of the input credential (e.g., a substring of the next shortest length) in a manner similar to that described above with respect to processing of the substring of the shortest length until a determined risk assessment score does not satisfy the predetermined risk threshold or all of the substrings of the input credential are processed.

FIG. 6 shows a table showing estimates of times to brute force guess character strings of varying lengths. The times shown in the table of FIG. 2 are estimate times that may be needed to brute force guess remaining portions of passwords of the indicated length (Remaining Password Length) composed of the indicated class of characters (Types of Characters Remaining (D=numeric; L=lower case; U=upper case; S=special)). The illustrated table in FIG. 6 also shows the number of characters that are included in the indicated class of characters or classes of characters. For instance, as shown in the table of FIG. 6, there are 10 numerical characters, 26 lower case characters, 52 upper case and lower case characters, 62 upper case, lower case, and numerical characters, and 95 upper case, lower case, numerical, and special characters. The estimate brute force times in FIG. 6 are determined using the following equation:

$$\text{Max Time} = \frac{(\text{\# of possible characters})^{Password\ Length}}{\text{Attempts per second}} \quad [1]$$

Equation [1] above assumes an attempts per second value of approximately 30 million attempts per second, and the maximum time that may be needed to brute force guess (Max Time) is inversely proportional to the maximum retries per second. In equation [1], the maximum time decreases as the attempts per second increases, for example, when a more powerful processor is utilized. Also, the maximum time increases exponentially with the length of the password (i.e., as the number of characters in the remaining portion of the password increases).

FIGS. 7A-7D collectively illustrate operation of data structures 702a-702d to record substrings of corporate credentials, in accordance with an embodiment of the present disclosure. In the example of FIGS. 7A-7D, the data structures 702a-702d (also referred to herein as Bloom filter 702a-702d) are a Bloom filter implemented using a 10-bit bit vector. In individual bit vectors, individual positions (i.e., individual bits) may be set to an initial value of zero ("0") to indicate that no elements (e.g., substrings of corporate passwords) have been added to the Bloom filter represented by that bit vector. In this example, k=3 hash functions may be defined for hashing a substring of a corporate password that is to be added to a Bloom filter. In this case, hashing a substring of a corporate password using the k=3 hash functions results in three positions in the bit vector. A position in the bit vector may also include or have associated therewith information related to the attributes of a remaining portion of a corporate password whose substring hashed (or mapped) to that position when hashed using the k=3 hash functions. While the present example uses a Bloom filter implemented as a 10-bit bit vector and k=3 hash functions, it will be appreciated that, in other embodiments, other types of data structures can be used to record substrings of corporate passwords. For example, a Bloom filter may be implemented using a data structure other than a bit array and/or may be of a different size. As another example, a different number of hash functions may be used, e.g., k<3 or k>3 hash functions.

With continued reference to the example of FIGS. 7A-7D, a user may login to a corporate resource (e.g., a corporate SaaS application) using a password, Secret@187eG. The corporate password, Secret@187eG, can then be segmented into one or more substrings of different lengths. In this example, the corporate password, Secret@187eG, is segmented into four substrings of four (4), five (5), six (6), and seven (7) characters from the beginning of the corporate password. The four substrings segmented from the corporate password, Secret@187eG, may then be recorded using Bloom filters 702a-702d. While four substrings of the corporate password are depicted in the example of FIGS. 7A-7D for the purposes of clarity, it will be appreciated that the corporate password may be segmented into a different number of substrings. Also, while the example shows segments of lengths four (4), five (5), six (6), and seven (7) characters, it will be appreciated that some or all of the segments may be of different lengths. In some embodiments, the number of substrings to segment from the corporate password and the respected lengths of the substrings may be predetermined parameters. For example, the organization may specify that the lengths of the substrings should start at an initial length of i characters (e.g., 1=4 as in the example of FIGS. 7A-7D) and sequentially increase up to a length of the number of characters in the corporate password.

Referring now to FIG. 7A, a substring, Secr, segmented from the corporate password, Secret@187eG, is input to the k=3 hash functions to obtain three (3) positions, 3, 6, 8, in the bit vector. The substring, Secr, is then added to Bloom filter 702a by setting the values of the hashed bit positions in the bit vector to a value of one (1). As can be seen in FIG. 7A, adding the substring, Secr, to Bloom filter 702a results in bit positions 3, 6, 8 in the bit vector being set to a value of one (1). The number of characters and the class of characters in the remaining portion, et@187eG, of the corporate password, Secret@187eG, are then recorded. In this example, the remaining substring, et@187eG, is composed of eight (8) characters of the class of characters upper case, lower case, numeric, and special (C=ULDS, where U=upper case, L=lower case, D=numeric, and S=special). As can be seen in FIG. 7A, the length (L=8) and the class of characters (C=ULDS) attribute information may be recorded at or otherwise associated with bit positions 3, 6, 8 in the bit vector that represent the substring, Secr, added to Bloom filter 702a.

Using the estimate brute force times illustrated in FIG. 6, a remaining portion (substring) of a password composed of eight (8) characters (L=8) of the class of characters upper case, lower case, numeric, and special (C=ULDS) can be brute force guessed in an estimated time of seven (7) years. Thus, given the corporate password, Secret@187eG, a variant of the corporate password (e.g., a personal password) that includes the substring, Secr, can be assigned a score (e.g., a risk assessment score) of seven (7) years.

Referring now to FIG. 7B, a substring, Secre, segmented from the corporate password, Secret@187eG, is input to the k=3 hash functions to obtain three (3) positions, 5, 6, 8, in the bit vector. The substring, Secre, is then added to Bloom filter 702b by setting the values of the hashed bit positions in the bit vector to a value of one (1). As can be seen in FIG. 7B, adding the substring, Secre, to Bloom filter 702b results in bit positions 5, 6, 8 in the bit vector being set to a value of one (1). The number of characters and the class of characters in the remaining portion, t@187eG, of the corporate password, Secret@187eG, are then recorded. In this example, the remaining substring, t@187eG, is composed of seven (7) characters of the class of characters upper case, lower case, numeric, and special (C=ULDS). As can be seen in FIG. 7B, the length (L=7) and the class of characters (C=ULDS) attribute information may be recorded at or otherwise associated with bit positions 5, 6, 8 in the bit vector that represent the substring, Secre, added to Bloom filter 702b.

Using the estimate brute force times illustrated in FIG. 6, a remaining portion (substring) of a password composed of seven (7) characters (L=7) of the class of characters upper case, lower case, numeric, and special (C=ULDS) can be brute force guessed in an estimated time of 27 days. Thus, given the corporate password, Secret@187eG, a variant of the corporate password (e.g., a personal password) that includes the substring, Secre, can be assigned a score (e.g., a risk assessment score) of 27 days.

Referring now to FIG. 7C, a substring, Secret, segmented from the corporate password, Secret@187eG, is input to the k=3 hash functions to obtain three (3) positions, 3, 8, 9, in the bit vector. The substring, Secret, is then added to Bloom filter 702c by setting the values of the hashed bit positions in the bit vector to a value of one (1). As can be seen in FIG. 7C, adding the substring, Secret, to Bloom filter 702c results in bit positions 3, 8, 9 in the bit vector being set to a value of one (1). The number of characters and the class of characters in the remaining portion, @187eG, of the corporate password, Secret@187eG, are then recorded. In this example, the remaining substring, @187eG, is composed of six (6) characters of the class of characters upper case, lower case, numeric, and special (C=ULDS). As can be seen in FIG. 7C, the length (L=6) and the class of characters (C=ULDS) attribute information may be recorded at or otherwise associated with bit positions 3, 8, 9 in the bit vector that represent the substring, Secret, added to Bloom filter 702c.

Using the estimate brute force times illustrated in FIG. 6, a remaining portion (substring) of a password composed of six (6) characters (L=6) of the class of characters upper case, lower case, numeric, and special (C=ULDS) can be brute force guessed in an estimated time of 6.8 hours. Thus, given the corporate password, Secret@187eG, a variant of the corporate password (e.g., a personal password) that includes the substring, Secret, can be assigned a score (e.g., a risk assessment score) of 6.8 hours.

Referring now to FIG. 7D, a substring, Secret@, segmented from the corporate password, Secret@187eG, is input to the k=3 hash functions to obtain three (3) positions, 0, 4, 8, in the bit vector. The substring, Secret, is then added to Bloom filter 702d by setting the values of the hashed bit positions in the bit vector to a value of one (1). As can be seen in FIG. 7D, adding the substring, Secret@, to Bloom filter 702*d* results in bit positions 0, 4, 8 in the bit vector being set to a value of one (1). The number of characters and the class of characters in the remaining portion, 187eG, of the corporate password, Secret@187eG, are then recorded. In this example, the remaining substring, 187eG, is composed of five (5) characters of the class of characters upper case, lower case, and numeric (C=ULD). As can be seen in FIG. 7D, the length (L=5) and the class of characters (C=ULD) attribute information may be recorded at or otherwise associated with bit positions 0, 4, 8 in the bit vector that represent the substring, Secret@, added to Bloom filter 702*d*.

Using the estimate brute force times illustrated in FIG. 6, a remaining portion (substring) of a password composed of five (5) characters (L=5) of the class of characters upper case, lower case, and numeric (C=ULD) can be brute force guessed in an estimated time of 31 seconds. Thus, given the corporate password, Secret@187eG, a variant of the corporate password (e.g., a personal password) that includes the substring, Secret@, can be assigned a score (e.g., a risk assessment score) of 31 seconds.

Figure 8:
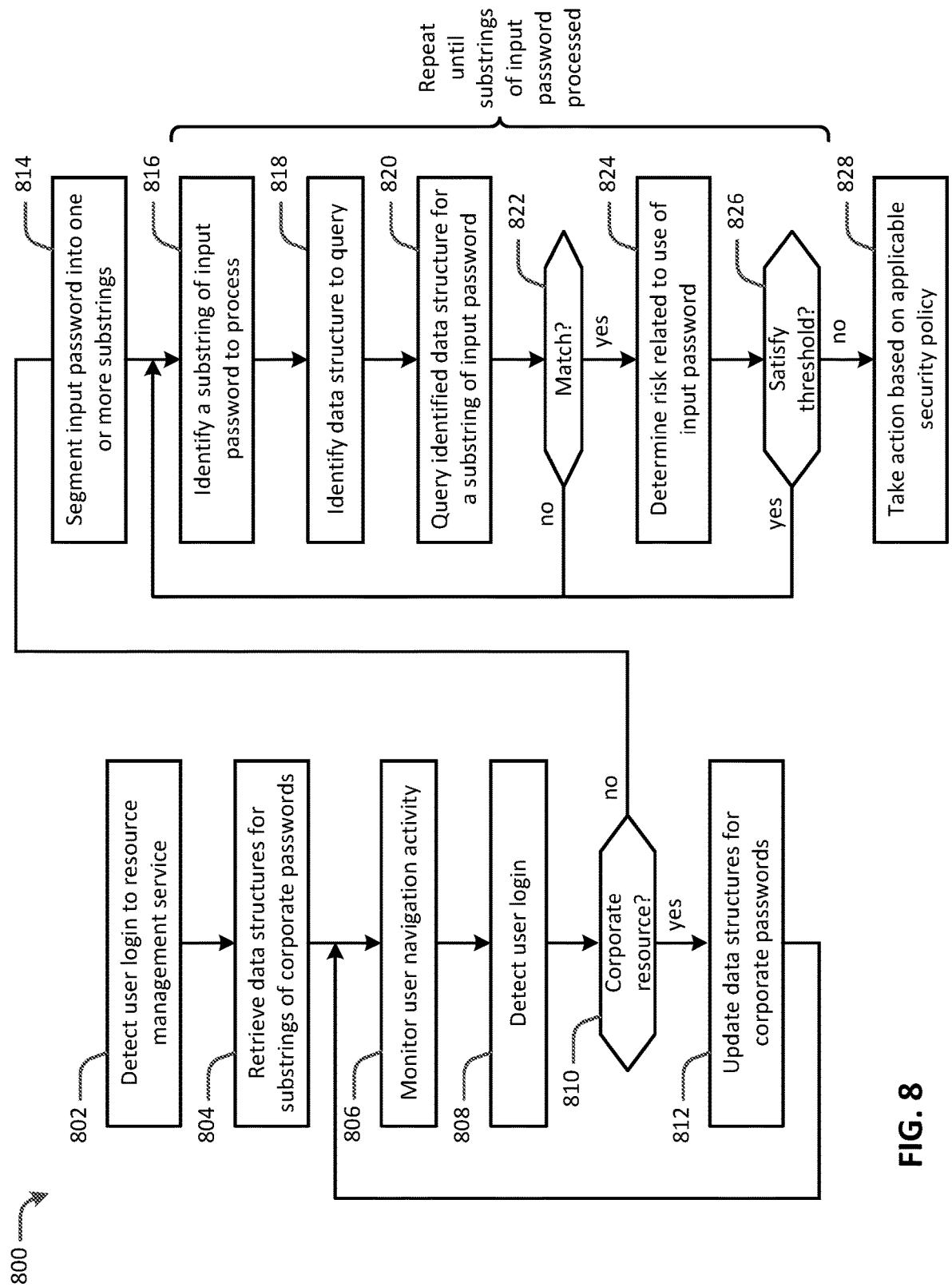
FIG. 8 is a flow diagram of an illustrative process for determining risk associated with usage of variants of corporate credentials, in accordance with an embodiment of the present disclosure.

FIG. 8 is a flow diagram of an illustrative process 800 for determining risk associated with usage of variants of corporate credentials, in accordance with an embodiment of the present disclosure. Example process 800 may be implemented or used within a computing environment or system such as those disclosed above at least with respect to FIG. 1, FIG. 2, FIG. 3, FIGS. 4A-4C and/or FIG. 5. For example, in some embodiments, the operations, functions, or actions illustrated in example process 800 may be stored as computer-executable instructions in a computer-readable medium, such as volatile memory 122 and/or non-volatile memory 128 of computing device 100 of FIG. 2 (e.g., computer-readable medium of client machines 102 of FIG. 1, client machines 102*a*-102*n* of FIG. 3, clients 202 of FIGS. 4A-4C, and/or client device 502 of FIG. 5). For example, the operations, functions, or actions described in the respective blocks of example process 800 may be implemented by applications 116 and/or data 117 of computing device 100.

With reference to process 800 of FIG. 8, a user, such as user 510, may execute resource access application 424 on client device 502. At 802, resource access application 424 may detect a login to resource management services 402. For example, user 510 may use resource access application 424 executing on client device 502 to login to resource management services 402. Upon login to resource management services 424, at 804, resource access application 424 may retrieve the corporate password substring data structures (e.g., Bloom filters 702*a*-702*d* of FIGS. 7A-7D) that are applicable to user 510. For example, the corporate password substring data structures (e.g., Bloom filters 702*a*-702*d*) that are applicable to user 510 may be retrieved from resource management services 402 or another backend service. The retrieved corporate password substring data structures that are applicable to user 510 may represent the substrings of corporate passwords belonging to user 510.

At 806, resource access application 424 may monitor user navigation activity. For example, resource access application 424 may monitor navigation events and determine whether the navigation is to a corporate resource or a personal resource. At 808, resource access application 424 may detect a user login event. If, at 810, resource access application 424 detects a login to a corporate resource, then, at 812, resource access application 424 may update the corporate password data structures. For example, resource access application 424 may segment a password (e.g., corporate password) that was input by user 510 to login to the corporate resource into one or more substrings of different lengths. Resource access application 424 may then add each substring of a specific length to a corporate password substring data structure (e.g., one of Bloom filters 702*a*-702*d* or another Bloom filter) that is being used for recording substrings of the specific length of the substring that is being added, as previously described herein. Adding the substrings of the input corporate password to an appropriate corporate password substring data structure in this manner updates the record of the corporate passwords belonging to user 510. Resource access application 424 may then continue monitoring user navigation activity, at 806.

Otherwise, if, at 810, resource access application 424 detects a login to a personal resource (i.e., a resource that is not a corporate resource), then, at 814, resource access application 424 may segment a password (e.g., personal password) that was input by user 510 to login to the personal resource into one or more substrings of different lengths. In an example implementation, the specific lengths of the substrings may be predetermined in a configuration file that is accessible by resource access application 424. For instance, the lengths of the one or more substrings of the personal password may be the same as the lengths of the substrings of the corporate passwords that have been recorded. At 816, resource access application 424 may then identify one of the one or more substrings of the personal password (e.g., the substring having the shortest length) for processing to determine whether the identified substring matches a substring of a corporate password.

At 818, resource access application 424 may identify a corporate password substring data structure (e.g., one of Bloom filters 702*a*-702*d* or another Bloom filter) to use in determining whether the identified substring of the personal password matches a substring of a corporate password. This can be accomplished, for example, by identifying a corporate password substring data structure used for recording substrings of the same length as the identified substring of the personal password that is being processed. In other words, the identified corporate password substring data structure is used for recording substrings of a length that is the same length as the substring of the personal password that is being matched.

At 820, resource access application 424 may query the identified corporate password substring data structure for the identified substring of the personal password. If, at 822, resource access application 424 determines that a match is not found for the identified substring of the personal password in the identified corporate password substring data structure (i.e., the substring of the personal password is not in the identified corporate password substring data structure), then, at 816, resource access application 424 may identify another substring of the personal password to process.

Otherwise, if, at 822, resource access application 424 determines that a match is found for the identified substring of the personal password in the identified corporate password substring data structure (i.e., the substring of the personal password is in the identified corporate password substring data structure), then, at 824, resource access application 424 may determine a risk related to the use of the personal password. Here, a match for the identified substring of the personal password in the identified corporate password substring data structure is an indication that the personal password is a variant of a corporate password. Also, this corporate password includes a substring that matches the identified substring of the personal password. As such, resource access application 424 may compute a score based on the information related to the attributes of the remaining portion of the corporate password, as previously described herein. Resource access application 424 may then assign the computed score to the personal password (i.e., the computed score is the risk related to the use of the variant of the corporate password).

At 826, resource access application 424 may determine whether the score assigned to the personal password satisfies a threshold. Here, the threshold may define an estimated time that may be needed to brute force guess a corporate password that is acceptable to the organization. For example, suppose that a threshold is set to one (1) year. In this example case, use of a variant of a corporate password (e.g., a personal password that is a variant of the corporate password) which leads in the corporate password to be brute force guessed in a time of one (1) year or longer is acceptable to the organization.

If the score assigned to the personal password satisfies the threshold, then, at 816, resource access application 424 may identify another substring of the personal password to process. In this case, the score indicated an estimated time that may be needed to brute force guess the corporate password that is at least as long as the time specified by the threshold. Resource access applicant 424 may then repeat blocks 816-826 until a score assigned to a personal password does not satisfy the threshold or until all the substrings of the input password are processed.

Otherwise, if the score assigned to the personal password does not satisfy the threshold, then, at 828, resource access application 424 may determine that the score indicated an estimated time that may be needed to brute force guess the corporate password that is shorter than the time specified by the threshold. In this case, resource access application 424 may take one or more actions based on an applicable security policy. For example, the applicable security policy may specify that resource access application 424 send or otherwise provide to a security operations center of the organization a notification of the risk associated with the use of the personal password (i.e., a variant of a corporate password). As another example, the applicable security policy may specify that resource access application 424 send or otherwise provide to user 510 a notification of the risk associated with the use of the personal password.

FURTHER EXAMPLE EMBODIMENTS

The following examples pertain to further embodiments, from which numerous permutations and configurations will be apparent.

Example 1 includes a method including: responsive to a user requesting authorization to access an application, by a computing device, segmenting a string of content into a plurality of substrings of different lengths, the string of content being an input to access the application; and responsive to a determination that data in a first data structure represents a first substring of the plurality, identifying a length of another substring and at least one type of character present within that substring based on the data in the first data structure, determining a risk of unauthorized use of the string of content based on the identified length and the at least one type of character present within that substring, and allowing access to the application using the string of content based on the determined risk.

Example 2 includes the subject matter of Example 1, wherein determining a risk of unauthorized use of the string of content comprises determining lengths of time taken to ascertain the another substring.

Example 3 includes the subject matter of any of Examples 1 and 2, further including, responsive to a determination that the user is allowed to access the application using the string of content based on the risk determined based on the first substring of the plurality of substrings, determining whether data in a second data structure represents a second substring of the plurality; and responsive to a determination that data in the second data structure represents the second substring of the plurality, identifying a length of another substring and at least one type of character present within that substring based on the data in the second data structure, determining a risk of unauthorized use of the string of content based on the identified length and the at least one type of character present within that substring, and allowing access to the application using the string of content based on the determined risk.

Example 4 includes the subject matter of any of Examples 1 through 3, further including providing a notification of the determined risk.

Example 5 includes the subject matter of any of Examples 1 through 4, wherein the first data structure is a Bloom filter.

Example 6 includes the subject matter of any of Examples 1 through 5, wherein the at least one type of character includes a lower-case character.

Example 7 includes the subject matter of any of Examples 1 through 6, wherein the at least one type of character includes an upper-case character.

Example 8 includes the subject matter of any of Examples 1 through 7, wherein the at least one type of character includes a numeric character.

Example 9 includes the subject matter of any of Examples 1 through 8, wherein the at least one type of character includes a special character.

Example 10 includes the subject matter of any of Examples 1 through 9, wherein the string of content is a user password.

Example 11 includes the subject matter of any of Examples 1 through 10, wherein the application is a personal application.

Example 12 includes the subject matter of any of Examples 1 through 11, wherein the plurality of substrings is a plurality of prefixes of the string of content.

Example 13 includes a system including a memory and one or more processors in communication with the memory and configured to: responsive to a user requesting authorization to access an application, segment a string of content into a plurality of substrings of different lengths, the string of content being an input to access the application; and responsive to a determination that data in a first data structure represents a first substring of the plurality, identify a length of another substring and at least one type of character present within that substring based on the data in the first data structure, determine a risk of unauthorized use of the string of content based on the identified length and the at least one type of character present within that substring, and allow access to the application using the string of content based on the determined risk.

Example 14 includes the subject matter of Example 13, wherein determining a risk of unauthorized use of the string of content comprises determining lengths of time taken to ascertain the another substring.

Example 15 includes the subject matter of any of Examples 13 and 14, wherein the one or more processors are further configured to, responsive to a determination that the user is allowed to access the application using the string of content based on the risk determined based on the first substring of the plurality of substrings, determine whether data in a second data structure represents a second substring of the plurality; and responsive to a determination that data in the second data structure represents the second substring of the plurality, identify a length of another substring and at least one type of character present within that substring based on the data in the second data structure, determine a risk of unauthorized use of the string of content based on the identified length and the at least one type of character present within that substring, and allow access to the application using the string of content based on the determined risk.

Example 16 includes the subject matter of any of Examples 13 through 15, wherein the one or more processors are further configured to provide a notification of the determined risk.

Example 17 includes the subject matter of any of Examples 13 through 16, wherein the first data structure is a Bloom filter.

Example 18 includes the subject matter of any of Examples 13 through 17, wherein the at least one type of character includes a lower-case character.

Example 19 includes the subject matter of any of Examples 13 through 18, wherein the at least one type of character includes an upper-case character.

Example 20 includes the subject matter of any of Examples 13 through 19, wherein the at least one type of character includes a numeric character.

Example 21 includes the subject matter of any of Examples 13 through 20, wherein the at least one type of character includes a special character.

Example 22 includes the subject matter of any of Examples 13 through 21, wherein the string of content is a user password.

Example 23 includes the subject matter of any of Examples 13 through 22, wherein the application is a personal application.

Example 24 includes the subject matter of any of Examples 1 through 23, wherein the plurality of substrings is a plurality of prefixes of the string of content.

Example 25 includes a method including: responsive to a user requesting authorization to access a personal application, by a computing device, segmenting a password input to request access to the personal application into a plurality of substrings of different lengths; and responsive to a determination that there is a match for a first substring of the plurality of substrings in a data structure that represents substrings of corporate passwords of the user, determining, from the data structure, classifications of one or more substrings of the corporate passwords of the user and lengths of the one or more substrings of the corporate passwords; determining a risk associated with a use of the password input to access the personal application based on the classifications of one or more substrings of the corporate passwords of the user and lengths of the one or more substrings of the corporate passwords; and allowing access to the personal application using the password based on the determined risk.

Example 26 includes the subject matter of Example 25, further including, responsive to a determination that the user is allowed to access the application using the password based on the risk determined based on the classifications of one or more substrings of the corporate passwords of the user and lengths of the one or more substrings of the corporate passwords, determining whether there is a match for a second substring of the plurality of substrings in a data structure that represents substrings of corporate passwords of the user; and responsive to a determination that there is a match for the second substring, determining, from the data structure, classifications of one or more substrings of the corporate passwords of the user and lengths of the one or more substrings of the corporate passwords; determining a risk associated with a use of the password input to access the personal application based on the classifications of one or more substrings of the corporate passwords of the user and lengths of the one or more substrings of the corporate passwords; and allowing access to the personal application using the password based on the determined risk.

Example 27 includes the subject matter of any of Examples 25 and 26, further including providing a notification of the determined risk.

Example 28 includes the subject matter of any of Examples 25 through 27, wherein the data structure is a Bloom filter.

Example 29 includes the subject matter of any of Examples 25 through 28, wherein the at least one type of character includes a lower-case character.

Example 30 includes the subject matter of any of Examples 25 through 29, wherein the at least one type of character includes an upper-case character.

Example 31 includes the subject matter of any of Examples 25 through 30, wherein the at least one type of character includes a numeric character.

Example 32 includes the subject matter of any of Examples 25 through 31, wherein the at least one type of character includes a special character.

Example 33 includes the subject matter of any of Examples 25 through 31, wherein the plurality of substrings is a plurality of prefixes of the password.

Example 34 includes a system including a memory and one or more processors in communication with the memory and configured to: responsive to a user requesting authorization to access a personal application, segment a password input to request access to the personal application into a plurality of substrings of different lengths; and responsive to a determination that there is a match for a first substring of the plurality of substrings in a data structure that represents substrings of corporate passwords of the user, determine, from the data structure, classifications of one or more substrings of the corporate passwords of the user and lengths of the one or more substrings of the corporate passwords; determine a risk associated with a use of the password input to access the personal application based on the classifications of one or more substrings of the corporate passwords of the user and lengths of the one or more substrings of the corporate passwords; and allow access to the personal application using the password based on the determined risk.

Example 35 includes the subject matter of Example 34, wherein the one or more processors are further configured to, responsive to a determination that the user is allowed to access the application using the password based on the risk determined based on the classifications of one or more substrings of the corporate passwords of the user and lengths of the one or more substrings of the corporate passwords, determine whether there is a match for a second substring of the plurality of substrings in a data structure that represents substrings of corporate passwords of the user; and responsive to a determination that there is a match for the second substring, determine, from the data structure, classifications of one or more substrings of the corporate passwords of the user and lengths of the one or more substrings of the corporate passwords; determine a risk associated with a use of the password input to access the personal application based on the classifications of one or more substrings of the corporate passwords of the user and lengths of the one or more substrings of the corporate passwords; and allow access to the personal application using the password based on the determined risk.

Example 36 includes the subject matter of any of Examples 34 and 35, wherein the one or more processors are further configured to provide a notification of the determined risk.

Example 37 includes the subject matter of any of Examples 34 through 36, wherein the data structure is a Bloom filter.

Example 38 includes the subject matter of any of Examples 34 through 37, wherein the at least one type of character includes a lower-case character.

Example 39 includes the subject matter of any of Examples 34 through 38, wherein the at least one type of character includes an upper-case character.

Example 40 includes the subject matter of any of Examples 34 through 39, wherein the at least one type of character includes a numeric character.

Example 41 includes the subject matter of any of Examples 34 through 40, wherein the at least one type of character includes a special character.

Example 42 includes the subject matter of any of Examples 34 through 41, wherein the plurality of substrings is a plurality of prefixes of the password.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modules executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:
1. A method comprising:
responsive to a user requesting authorization to access an application, by a computing device, segmenting a string of content into a plurality of substrings of different lengths, the string of content being an input to access the application; and responsive to a determination that data in a first data structure represents a first substring of the plurality, identifying a length of another substring and at least one type of character present within that substring based on the data in the first data structure;

determining a risk of unauthorized use of the string of content based on the identified length and the at least one type of character present within that substring;

allowing access to the application using the string of content based on the determined risk;

responsive to a determination that the user is allowed to access the application using the string of content based on the risk determined based on the first substring of the plurality of substrings, determining whether data in a second data structure represents a second substring of the plurality; and responsive to a determination that data in the second data structure represents the second substring of the plurality, identifying a length of a second substring and at least one type of character present within the second substring based on the data in the second data structure;

determining a second risk of unauthorized use of the string of content based on the identified length and the at least one type of character present within the second substring; and allowing access to the application using the string of content based on the determined second risk.

2. The method of claim 1, wherein determining a risk of unauthorized use of the string of content comprises determining lengths of time taken to ascertain the another substring.

3. The method of claim 1, further comprising providing a notification of the determined risk.

4. The method of claim 1, wherein the first data structure is a Bloom filter.

5. The method of claim 1, wherein the at least one type of character includes a lower-case character.

6. The method of claim 1, wherein the at least one type of character includes an upper-case character.

7. The method of claim 1, wherein the at least one type of character includes a numeric character.

8. The method of claim 1, wherein the at least one type of character includes a special character.

9. The method of claim 1, wherein the string of content is a user password.

10. The method of claim 1, wherein the application is a personal application.

11. The method of claim 1, wherein the plurality of substrings is a plurality of prefixes of the string of content.

12. A system comprising:
a memory; and
one or more processors in communication with the memory and configured to,
responsive to a user requesting authorization to access an application, by a computing device,
segment a string of content into a plurality of substrings of different lengths, the string of content being an input to access the application; and
responsive to a determination that data in a first data structure represents a first substring of the plurality,
identify a length of another substring and at least one type of character present within that substring based on the data in the first data structure;
determine a risk of unauthorized use of the string of content based on the identified length and the at least one type of character present within that substring;
allow access to the application using the string of content based on the determined risk;
responsive to a determination that the user is allowed to access the application using the string of content based on the risk determined based on the first substring of the plurality of substrings,
determine whether data in a second data structure represents a second substring of the plurality; and
responsive to a determination that data in the second data structure represents the second substring of the plurality,
identify a length of a second substring and at least one type of character present within the second substring based on the data in the second data structure;
determine a second risk of unauthorized use of the string of content based on the identified length and the at least one type of character present within the second substring, and
allow access to the application using the string of content based on the second determined risk.

13. The system of claim 12, wherein to determine a risk of unauthorized use of the string of content comprises to determine lengths of time taken to ascertain the another substring.

14. The system of claim 12, wherein the one or more processors are further configured to provide a notification of the determined risk.

15. The system of claim 12, wherein the first data structure is a Bloom filter.

16. The system of claim 12, wherein the at least one type of character includes one of a lower-case character, an upper-case character, a numeric character, or a special character.

17. The system of claim 12, wherein the plurality of sub strings is a plurality of prefixes of the string of content.

18. A method comprising:
responsive to a user requesting authorization to access a personal application, by a computing device,
segmenting a password input to request access to the personal application into a plurality of substrings of different lengths; and
responsive to a determination that there is a match for a first substring of the plurality of substrings in a data structure that represents substrings of corporate passwords of the user,
determining, from the data structure, classifications of one or more substrings of the corporate passwords of the user and lengths of the one or more substrings of the corporate passwords;
determining a risk associated with a use of the password input to access the personal application based on the classifications of one or more substrings of the corporate passwords of the user and lengths of the one or more substrings of the corporate passwords; and
allowing access to the personal application using the password based on the determined risk.

* * * * *